United States Patent [19]

Sauber

[11] Patent Number: 4,930,659
[45] Date of Patent: Jun. 5, 1990

[54] DRAIN BAFFLE GROMMET FOR VEHICLE COMPARTMENTS

[76] Inventor: Charles J. Sauber, 10 N. Sauber Rd., Virgil, Ill. 60182

[21] Appl. No.: 340,761

[22] Filed: Apr. 14, 1989

[51] Int. Cl.⁵ .............................................. B65D 39/00
[52] U.S. Cl. .................................. 220/367; 220/85 R; 220/367
[58] Field of Search ...................... 220/85 R, 306, 307, 220/367, 241, DIG. 6

[56] References Cited

U.S. PATENT DOCUMENTS

| | | | |
|---|---|---|---|
| 2,933,102 | 4/1960 | Hillman et al. | 220/367 X |
| 3,168,961 | 2/1965 | Yates | 220/307 |
| 4,399,927 | 8/1983 | Yaotani et al. | 220/307 |
| 4,557,396 | 12/1985 | Baumgarten | 220/367 X |
| 4,658,979 | 4/1987 | Mietz et al. | 220/209 |

*Primary Examiner*—Steven M. Pollard
*Attorney, Agent, or Firm*—Leydig, Voit & Mayer

[57] ABSTRACT

A drain device for use with a vehicle body floor having an opening, the device being a unitarily formed hollow structure of flexible elastomeric material that has a right angled hood of generally hopper shape at its outlet end, an inlet end and an intermediate portion which is smaller than the adjacent peripheral parts of the inlet and outlet ends and corresponds substantially to the peripheral shape of the opening such that the drain device may be deformably inserted into the floor opening and positively held in the opening by the peripheral parts of the inlet end and outlet hood portions in their normal and undeformed conditions.

7 Claims, 1 Drawing Sheet

DRAIN BAFFLE GROMMET FOR VEHICLE COMPARTMENTS

FIELD OF THE INVENTION

This invention relates generally to vehicle compartment floor drains, and more particularly concerns drain devices for floors of vehicle utility bodies to allow water to move out of the closed bodies while preventing road water from entering the compartment.

BACKGROUND OF THE INVENTION

It is often desirable to provide some type of drain in the floor of a vehicle body having a closed compartment. Typical approaches that have been followed for molded fiberglass utility bodies have included providing perforations, slots, or openings in the floor as drains. In order to protect against the entry of water splashing up from the road through any openings provided for draining, typically some type of hood like fixture, baffle or flap has been affixed to the inside or outside floor wall surrounding the openings. Generally, these fixtures are costly and somewhat labor intensive for installation and even more so when replacement is required since it is usually necessary to manually remove an original fitting and then install a replacement using some type of fastener arrangement.

OBJECTS AND SUMMARY OF THE INVENTION

It is, therefore, a primary object of the present invention to provide an improved drain device for the floor of vehicle utility bodies that is relatively simple and low cost in production and permits easy installation and removal for replacement with great facility.

A further object of the invention is to provide an improved drain device of the type described above which can be economically manufactured at high production rates.

It is yet another object of one particular aspect of this invention to provide such an improved drain device which is self resistant to damage or breakage when struck by objects in use and is less likely to compound damage to the vehicle body when it should happen to be struck by an object.

Other objects and advantages of the invention will become apparent from the following detailed description taken in conjunction with the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
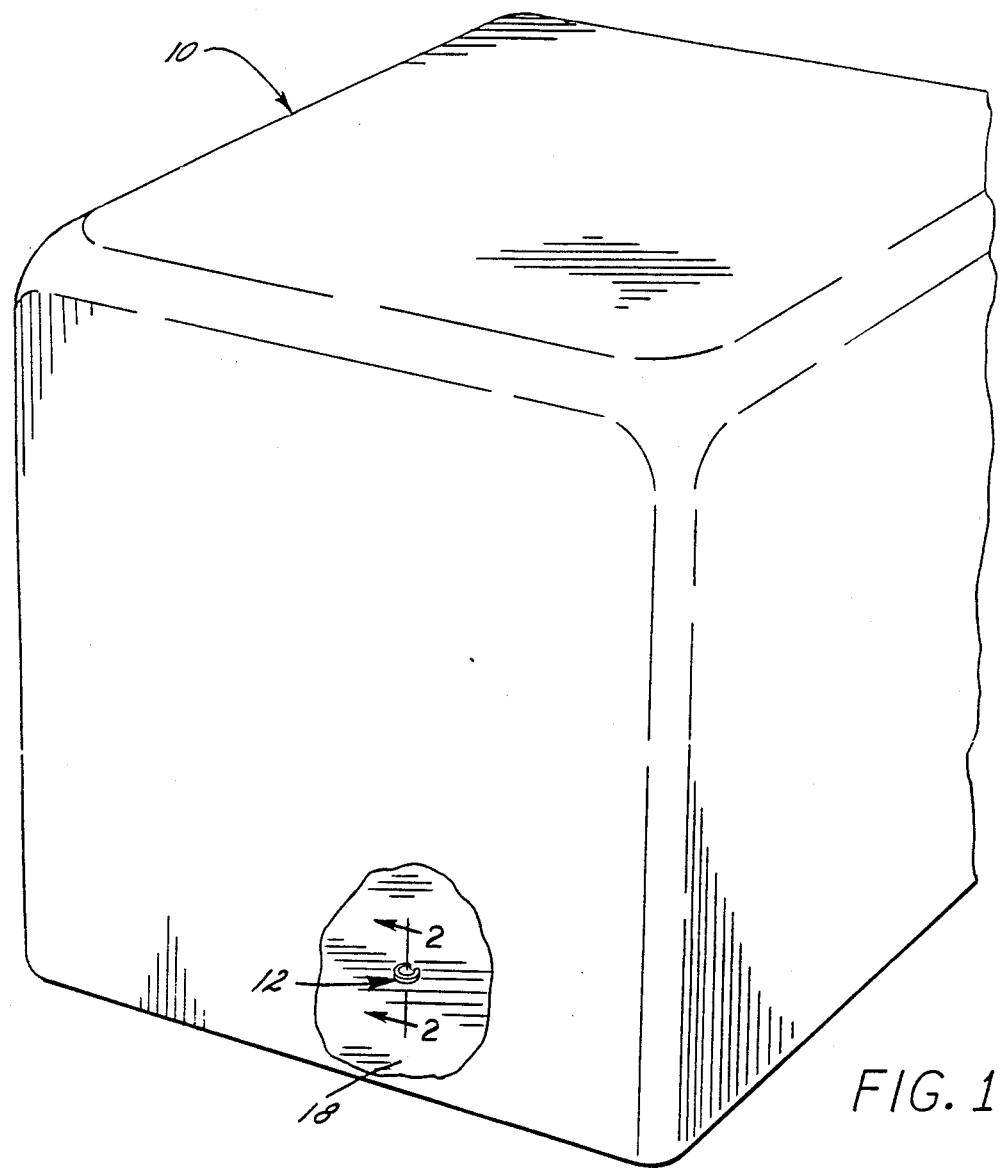
FIG. 1 is a fragmentary perspective view of a vehicle body utilizing drain devices in accordance with the present invention.
Figure 2:
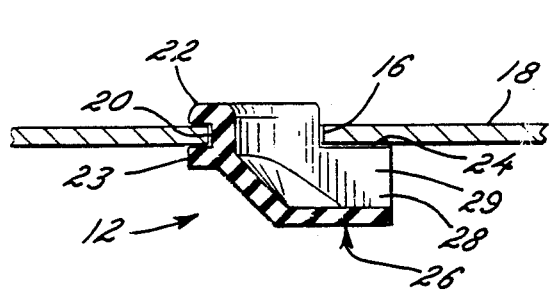
FIG. 2 is an enlarged cross section of a drain device shown in and taken along the line of 2—2 in FIG. 1.
Figure 3:
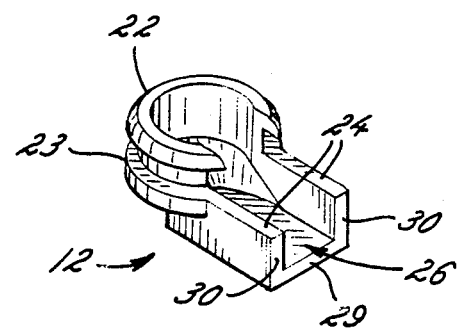
FIG. 3 is a perspective view of a drain device shown in FIG. 1.

Turning to the drawings, there is shown in FIG. 1 an exemplary vehicle body generally indicated at 10, which may be of the type constructed from molded fiberglass and wherein a drain device 12 of the subject invention is installed on the floor of the utility body. As best shown by reference to FIGS. 2 and 3, conjointly, the drain device 12 is a unitary construction and formed of an elastomeric material such as soft rubber or a deformable plastic. The construction of the drain device 12 is such that it may be easily installed simply by deformation and insertion in a circular opening 16 formed in the floor 18 of the vehicle body. The structure includes a grommet like intermediate circular portion 20 having a length approximately the thickness of the floor wall. Enlarged portions on the outside and inside are formed in part by semicircular flanges 22, 23 and the inward walls 24 of an outer hopper shaped hood 26.

In the present instance, the right angled hood has a rectangular shaped outer opening 28 defined by top wall 29 and side walls 30 which merge to a central circular shaped elbow center portion. The flanges 22, 23 have an arcuate extent which is interrupted so as to allow water to flow into the center.

It is preferred that the outer hood opening is positioned at the right angle position when mounted on the floor of a vehicle utility body so that in rain or snow conditions, or even water splashing up from a road, the water will be prevented from entering through the floor opening 16.

Since the drain device is one piece and very resilient, it is not apt to be broken or cause damage to the utility body if struck by a rigid object. It will be appreciated that the drain device of the present invention can be produced in large volumes at low cost and it is easily installed and replaced should it deteriorate or be knocked out by a object striking the device. Furthermore, the drain device of the present invention is self-holding in place and does not require any fastening devices such as screws or bolts for installation.

I claim:

1. A drain device for use with a vehicle body floor having an opening therein comprising:
    a unitarily formed hollow structure of flexible elastomeric material including an inlet end portion, an outlet end portion and an intermediate portion having an outer periphery smaller than the adjacent peripheral parts of the inlet and outlet portions and the intermediate portion periphery corresponding substantially to the periphery of said body floor opening, the outlet end portion being in the form of a right angle hood having at least a top and side walls, and
    said drain device being adapted to be deformably inserted into the body floor opening and positively held in the opening by the peripheral parts of said inlet and outlet portions in their normal undeformed conditions.

2. A drain device as claimed in claim 1 wherein the outlet end portion is in the form of a right angled hood of generally rectangular hopper shape.

3. A drain device as claimed in claim 2 wherein the inlet portion is interrupted so as to leave a gap with respect to the floor opening.

4. A drain device as claimed in any of claims 1, 2 or 3 wherein said hopper shaped portion has a generally rectangular end opening.

5. A drain device as claimed in any of claims 1, 2, 3, or 4 wherein the elastomeric material is rubber.

6. A drain device as claimed in any of claims 1, 2, 3, or 4 wherein the elastomeric material is soft plastic.

7. A drain device as claimed in any of claims 1, 2, or 3 wherein the vehicle body floor opening and the intermediate peripheral portion are circular in shape.

* * * * *